(12) United States Patent
Guttenberg

(10) Patent No.: US 8,596,622 B2
(45) Date of Patent: Dec. 3, 2013

(54) RAPID-RELEASE BELT SPLICER AND METHOD OF OPERATION

(75) Inventor: Robert G. Guttenberg, Jefferson, LA (US)

(73) Assignee: Laitram, L.L.C., Harahan, LA (US)

( * ) Notice: Subject to any disclaimer, the term of this patent is extended or adjusted under 35 U.S.C. 154(b) by 972 days.

(21) Appl. No.: 12/580,351

(22) Filed: Oct. 16, 2009

(65) Prior Publication Data

US 2011/0089620 A1   Apr. 21, 2011

(51) Int. Cl.
B23Q 1/32 (2006.01)

(52) U.S. Cl.
USPC .......................................................... 269/32

(58) Field of Classification Search
USPC .......... 269/42, 228, 254 CS, 43, 156, 136, 95
See application file for complete search history.

(56) References Cited

U.S. PATENT DOCUMENTS

| | | | | |
|---|---|---|---|---|
| 4,716,811 A * | 1/1988 | Johnson | | 89/40.12 |
| 4,765,862 A | 8/1988 | Azuma | | |
| 4,867,835 A | 9/1989 | Poole | | |
| 5,104,102 A * | 4/1992 | Buxton | | 269/43 |
| 5,118,024 A * | 6/1992 | McClure | | 228/44.5 |
| 5,690,776 A | 11/1997 | Anderson | | |
| 5,954,320 A * | 9/1999 | Bohler | | 269/43 |
| 7,331,093 B2 * | 2/2008 | Ferrari | | 29/38 B |
| 2008/0073823 A1 * | 3/2008 | Lin | | 269/228 |
| 2009/0007741 A1 | 1/2009 | Zieger | | |
| 2010/0013137 A1 * | 1/2010 | Weller | | 269/218 |
| 2011/0089620 A1 * | 4/2011 | Guttenberg | | 269/42 |

FOREIGN PATENT DOCUMENTS

| | | |
|---|---|---|
| DE | 102005034220 A1 | 1/2007 |
| GB | 438845 A | 11/1935 |

OTHER PUBLICATIONS

"ThermoDrive Splicing System" brochure, MOL Industries, Grand Rapids, Michigan, U.S.A., first published Sep. 2006.
ISA/EP International Search Report and Written Opinion of the International Searching Authority of PCT/US10/52033, mailed Jan. 24, 2011, European Patent Office, Rijswijk, NL.

* cited by examiner

*Primary Examiner* — Lee D Wilson
(74) *Attorney, Agent, or Firm* — James T. Cronvich

(57) ABSTRACT

A belt splicer for butt-welding conveyor belts and methods for its operation. The belt splicer has clamp jaws that close to contact the butt edges of two belt sections against opposite ends of a heating wand and to hold the two melted butt edges together as they weld to each other. A toggle linkage assembly locks the clamped jaws closed and stores energy in a spring mechanism. The toggle linkage assembly allows the rapid release of the spring energy to accelerate the clamp jaws open to pull the melted butt ends rapidly away from the sides of the wand to avoid sticking. In another version, an air cylinder is used instead of the toggle linkage assembly and spring mechanism to close and rapidly open the splicer.

20 Claims, 6 Drawing Sheets

RAPID-RELEASE BELT SPLICER AND METHOD OF OPERATION

BACKGROUND

The invention relates generally to splicing tools for thermally joining the butt edges of plastic conveyor belts and more particularly to splicing tools that rapidly release the butt edges from the sides of a heating wand.

Splicing presses are used to weld the butt ends of two thermoplastic conveyor belt sections together. Conventional presses include a pair of clamps, each of which holds one of the two belt sections. The clamps firmly hold the belt sections with the butt ends facing each other across a gap. A heating wand is moved into the gap, and the two clamps close until the butt ends of the belt sections contact opposite sides of the heating wand. As soon as the butt ends are softened or melted sufficiently by the wand's heat, the clamps are retracted so that the wand may be removed. Then the clamps are moved toward each other until the softened or melted butt ends meet. The clamps hold the butt ends together as the joint at their interface cools.

Although splicing presses as described work well with belts made of most thermoplastic materials, some materials, such as polyester, tend to stick to the sides of the wand when the clamps are retracted. This resulting loss of belt material to the wand diminishes the quality of the resulting joint. And the material that sticks to the wand has to be cleaned off. Thus, there is a need for a belt splicer that can work with belts made of sticky thermoplastic materials, such as polyester.

SUMMARY

This need is addressed by a belt splicer embodying features of the invention. The belt splicer comprises a pair of confronting clamp jaws connected to means for rapidly releasing the clamp jaws. The means for rapidly releasing the clamp jaws, such as a toggle linkage assembly and spring mechanism or a pneumatic cylinder, directs a force impulse against the first and second clamp jaws in opposite directions to accelerate the first and second clamp jaws rapidly apart.

Another version of the belt splicer comprises a toggle linkage assembly operating a pair of clamp jaws in a confronting relationship. A spring mechanism is attached between the toggle linkage assembly and the clamp jaws. The toggle linkage assembly is operable from a locked state to a released state. In the locked state of the toggle linkage assembly, the spring mechanism has a high level of stored energy and pushes the clamped jaws toward each other. In the released state, the spring mechanism rapidly releases its stored energy to accelerate the clamped jaws rapidly apart.

In another aspect of the invention, a method for operating a belt splicer, comprises: (a) retaining the butt edges of two belt sections aligned in a confronting relationship in a pair of clamp jaws; (b) positioning a heating element between the clamp jaws; (c) moving the clamp jaws toward each other to a closed position with the butt edges of the two belt sections in contact with the heating element to melt the butt edges; and (d) rapidly accelerating the clamp jaws apart to cleanly separate the melted butt edges from the heating element.

BRIEF DESCRIPTION OF THE DRAWINGS

These features of the invention, as well as its advantages, are better understood by referring the following description, appended claims, and accompanying drawings, in which:

DETAILED DESCRIPTION

Figure 1:
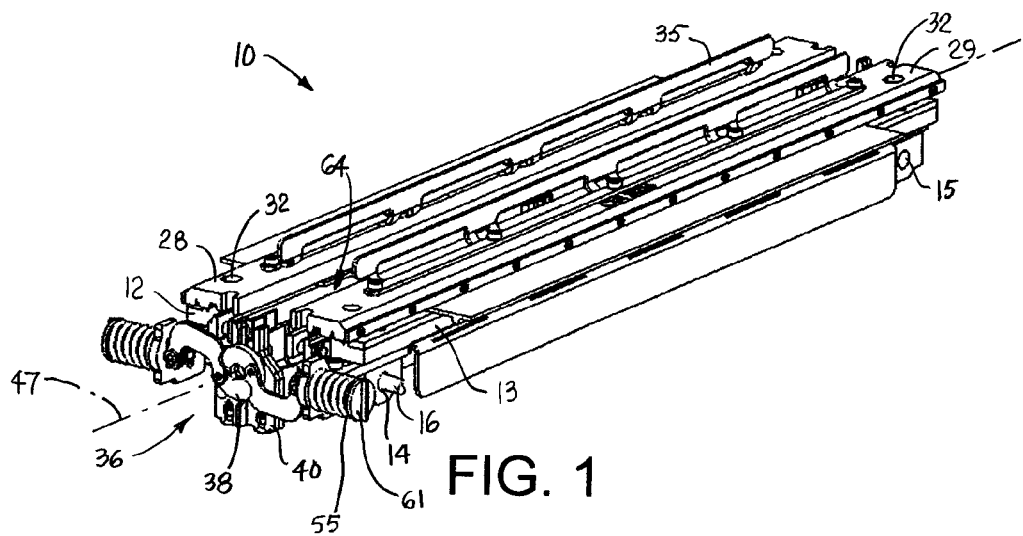
FIG. 1 is an isometric view of a belt splicer embodying features of the invention.
Figure 2:
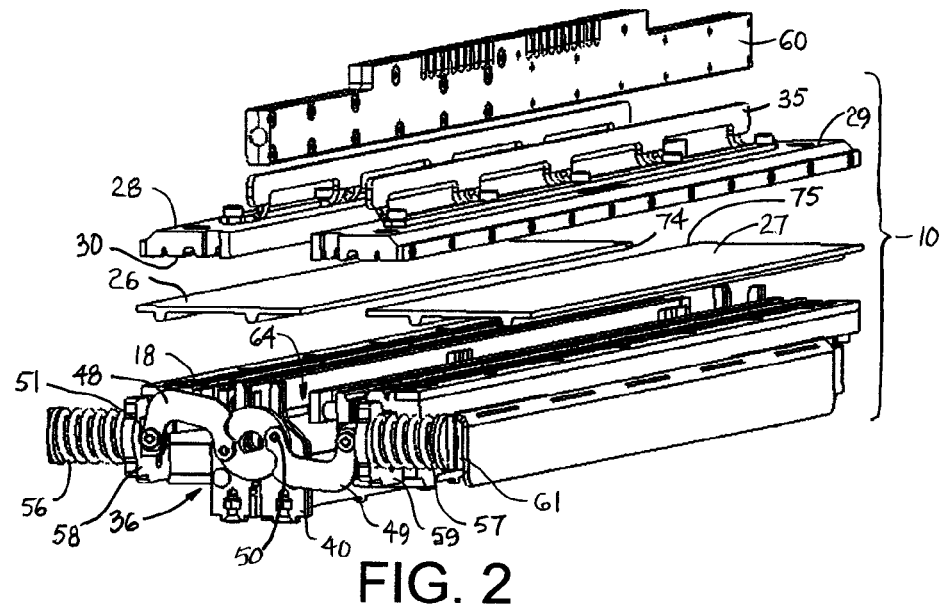
FIG. 2 is an exploded view of the belt splicer of FIG. 1.
Figure 3:
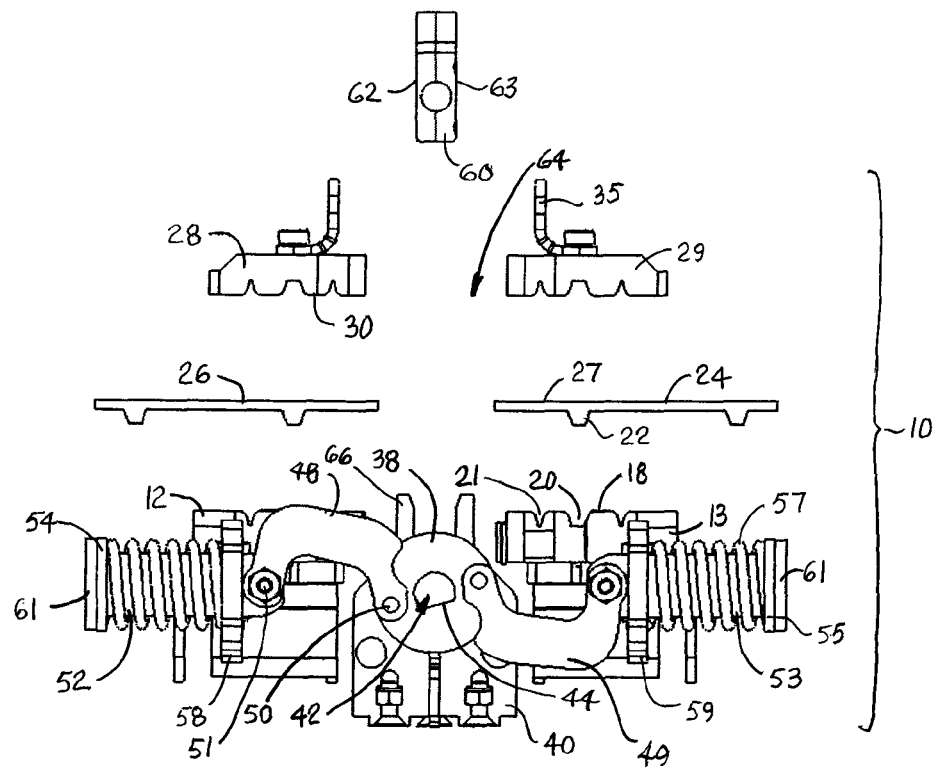
FIG. 3 is an exploded end elevation view of one end of the belt splicer of FIG. 1.

A splicing tool embodying features of the invention is shown in FIG. 1 and with a heating wand in FIGS. 2 and 3. The tool 10, which is generally symmetric end to end and left to right, includes left and right clamp jaws 12, 13 having holes 14, 15 at each end of the tool. The holes in the left clamp jaw align with the holes in the right clamp jaw. Transverse rails 16 extending through the holes 14, 15 and supported in the splicing tool's frame align the clamp jaws and provide supporting guides along which the jaws move toward and away from each other. An upper deck 18 on the clamp jaws 12, 13 has alignment grooves 20, 21 recessed inward of its top surface to mate with structure, such as transverse ribs 22 on a non-flat side of a conveyor belt 24 to be spliced. For the conveyor belt shown in FIG. 3, the drive rib 22 is received in the wider groove 20 in the upper deck 18 of the clamp jaw. The narrow grooves 21 accommodate belts having narrower transverse ribs. The grooves allow the belt end sections 26, 27 to sit flat on the upper deck of the jaws to register both belt sections vertically and horizontally in alignment.

The two belt end sections 26, 27 to be spliced together are sandwiched between the corresponding left and right clamp jaws 12, 13 and left and right top clamps 28, 29. A bottom surface 30 of the top clamps is grooved like the upper deck 18 of the clamp jaws so that the belt end sections 26, 27 may alternatively be welded together bottom side up, such as when splicing a belt together in situ in the lower returnway. The top clamps have alignment holes 32 at each end that receive pins 34 (FIG. 5) to align the top clamps with the corresponding clamp jaws even during translation of the clamp jaws. Elongated handles 35 fastened to the top of the top clamps aid in easy removal of the top clamps to release the spliced belt.

The clamp jaws are opened and closed by a toggle linkage assembly 36—one at each end of the splicer. The toggle linkage assembly includes a central hub 38 rotatably mounted on a support block 40 fastened to the splicer frame. The hub has a central bore 42 with a flat 44. The hub is mounted on a shaft 46 (FIG. 5) that extends the length of the splicer and defines an axis of rotation 47 of the hub. The hub of the toggle linkage assembly at the other end of the splicer is mounted on the other end of the shaft. The shaft extends outward past one or both of the toggle linkage assemblies to receive a handle, such as one of those depicted in FIGS. 8 and 9, for an operator to operate the splicer.

U-shaped left and right linkage arms 48, 49 are mounted to the face of the hub 38 on pivots 50 at the proximal ends of the arms. The pivots are diametrically opposite each other across the axis 47 of the hub 38. Distal ends of the arms are pivotally attached at pivots 51 to ends of left and right drawbars 52, 53 of spring assemblies. The drawbars terminate at their opposite ends in heads 61 retaining left and right spring retainers 54, 55. Left and right compression springs 56, 57 coaxially surrounding the drawbars 52, 53 extend from the spring retainers 54, 55 to left and right spring seats 58, 59 integral with the clamp jaws 12, 13. The spring assemblies form a spring mechanism that enables the closing and rapid opening of the clamp jaws. A heating wand 60 housing a heating element between opposite contact sides 62, 63 is positionable in a gap 64 between the clamp jaws and registered in position by wand rests 66 extending up from the hub support 40.

Figure 5:
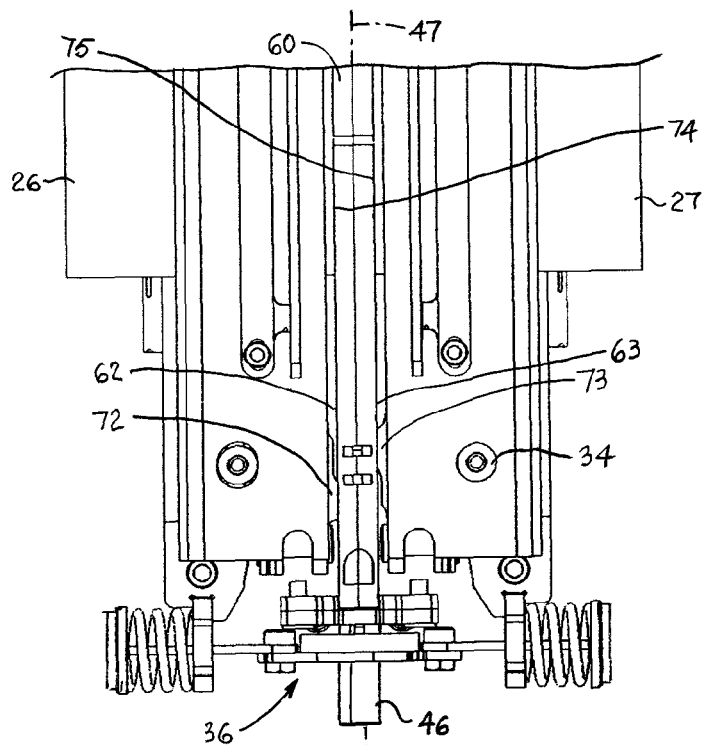
FIG. 5 is a top plan view of one end of the belt splicer of FIG. 1 during the heating process.
Figure 4A:
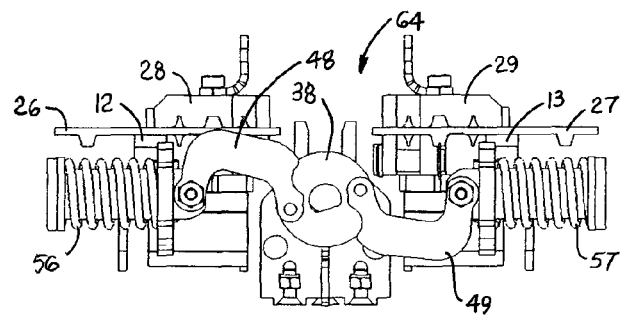
FIGS. 4A-4E are end elevation views of the belt splicer of FIG. 1, showing the operation of the toggle linkage assembly during the heating process.
Figure 4B:
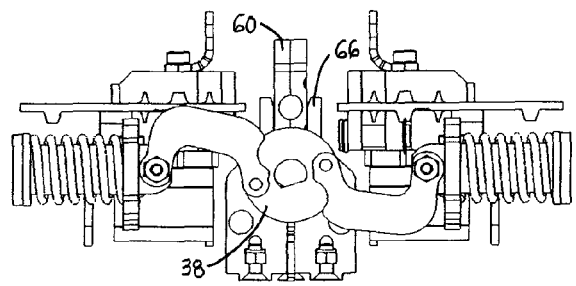
Figure 4C:
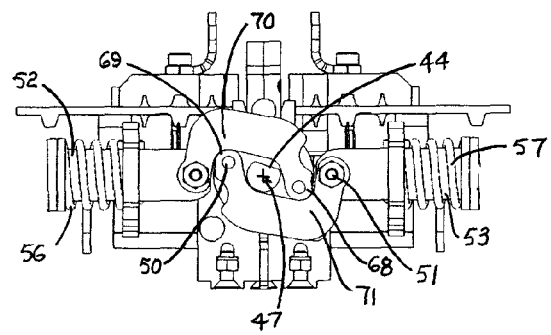

The operation of the toggle linkage assembly 36 is illustrated in FIGS. 4A-4E. In FIG. 4A, the clamp jaws 12, 13 are separated a maximum distance across the gap 64. The belt end sections 26, 27 are clamped between the clamp jaws and the top clamps 28, 29 on each side of the gap. The hub 38 is rotated to an angular position for which the linkage arms 48, 49 do not overlap vertically and the springs 56, 57 are in an elongated, generally relaxed state with little stored energy. This represents the fully released position of the toggle linkage assembly. In FIG. 4B, the heating wand 60 is shown placed between the wand rests 66. The toggle linkage hub 38 is still in the fully released position. In FIG. 4C, the toggle linkage assembly 38 is shown in its locked position. The flat 44 on the bore 42 of the hub 38 indicates that the hub has been rotated clockwise about 210° from its fully relaxed position in FIG. 4B. In the locked position, the two linkage arms overlap each other with their proximal pivots 50 on the hub in an over-center position on opposite sides of the hub's axis of rotation 47 from their distal pivotal connections 51 with the drawbars 52, 53. The proximal ends 68, 69 of the arms nestle behind each other's knees 70, 71, which provide stops that prevent the compressed springs 56, 57 from rotating the hub portion. With the toggle linkage assembly in this stable, locked position, the springs close the clamp jaws until spacer pads 72, 73 on the confronting faces of the clamp jaws at each end of the jaws contact the sides 62, 63 of the wand 60, as shown in FIG. 5. The butt edges 74, 75 (FIG. 2) of the belt sections 26, 27 contact the sides of the wand in this closed position and are melted. Meanwhile, the linkage arms 48, 49 pull the drawbars 52, 53 toward the hub 38, compressing the springs 56, 57. In this state, the energy stored in the compressed springs is close to a maximum.

Figure 4D:
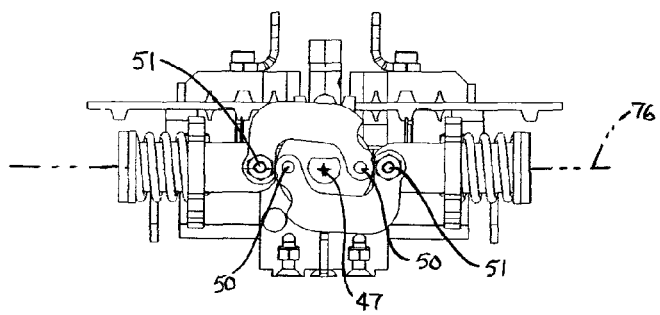
Figure 4E:
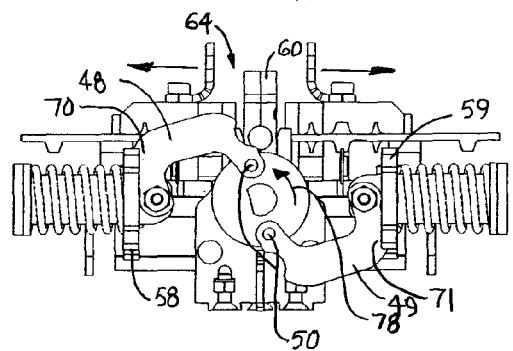

Once the butt edges 74, 75 are sufficiently melted by the heating wand 60, the clamp jaws 12, 13 can be released. The hub 38 is rotated counterclockwise. At the toggle position of the toggle linkage assembly, as shown in FIG. 4D, the proximal pivots 50 and the distal pivots 51 of both arms are in line with each other, with the axis of rotation 47 of the hub, and with the axis 76 of the drawbars. This also represents the greatest compression of the springs and, so, the maximum energy stored in the springs. As soon as the hub is rotated slightly more counterclockwise, the compressed springs rapidly release their stored energy into the linkage arms 48, 49, which rotate the hub counterclockwise 78 as shown in FIG. 4E. The freewheeling hub rotates the proximal pivots 50 of the linkage arms, whose knees 70, 71 push outward against the spring seats 58, 59 with a short-duration, high-amplitude force impulse to open the clamp jaws. The sudden freewheeling of the hub accelerates the opening of the clamp jaws to rapidly separate the belt edges of the belt section from the sides of the heating wand. The rapid separation of the butt edges from the wand caused by the rapid release of the spring energy into the toggle linkage assembly to create the force impulse that acts against each of the clamp jaws' spring seats in opposite directions prevents sticky thermoplastic belt material, such as polyester, from sticking to the sides of the wand. The hub continues to freewheel counterclockwise until it reaches its fully retracted position in FIG. 4A. The wand 60 can then be lifted from the gap 64. To prevent the clamp jaws from rebounding and reclosing, the linkage arms compress the springs slightly by pushing against the spring seats when the hub is in a position between that of FIGS. 4E and 4A. Thus, the toggle linkage assembly represents one means for rapidly releasing the clamp jaws.

Figure 6:
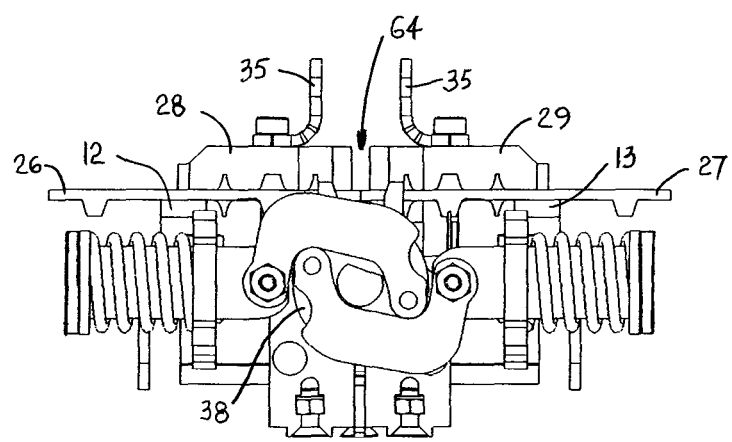
FIG. 6 is an end elevation view of the belt splicer of FIG. 1, showing the butt-welding process.
Figure 7:
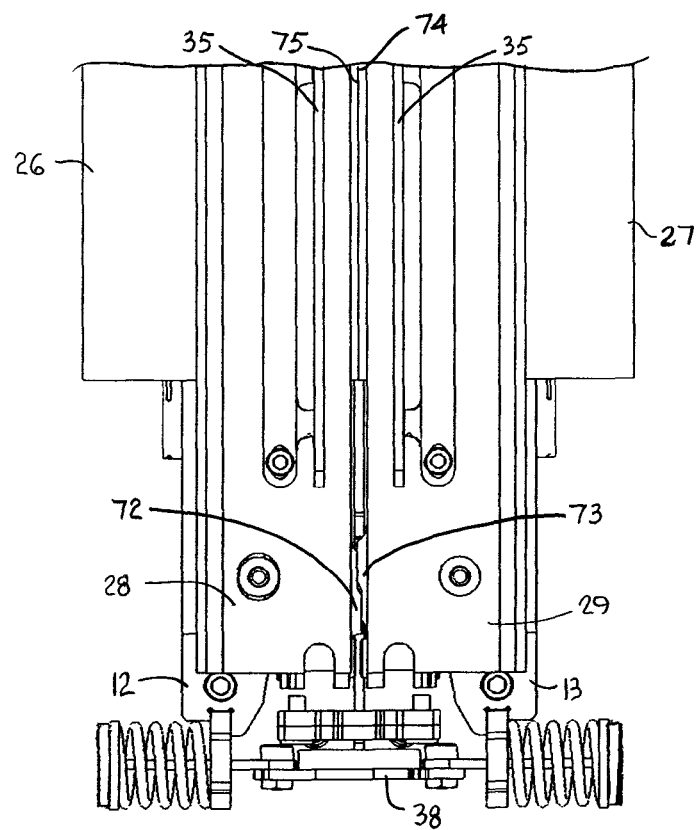
FIG. 7 is a top plan view of one end of the belt splicer of FIG. 1, showing the belt butt- welding process.

After the heating wand is removed, the clamp jaws 12, 13 are closed again by rotating the hub 38 clockwise past the over-center toggle point to the locked position, as shown in FIGS. 6 and 7. With the wand absent, the gap 64 between the jaws is narrower so that the melted butt edges 74, 75 of the belt sections 26, 27 are pressed tightly together as the weld cures. The confronting spacer pads 72, 73 at each end of the clamp jaws are in contact to maintain the proper distance between the clamp jaws so that the pitch of the belt, as measured between consecutive transverse ribs, is maintained. Once the two belt sections are welded together, the upper clamps 28, 29 are lifted by the handles 35, and the welded belt is removed from the splicer.

Figure 8:
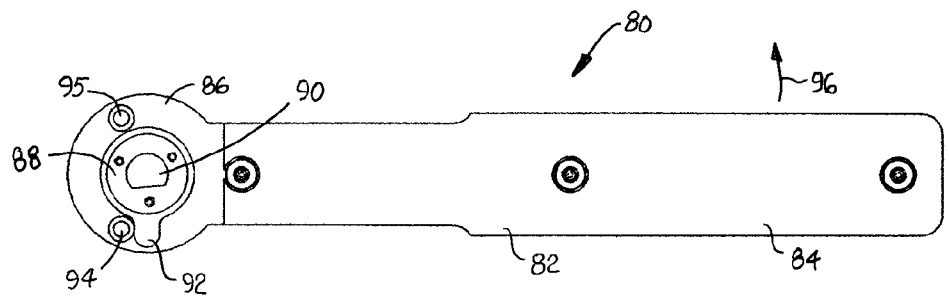
FIG. 8 is a side view of a handle usable with the belt splicer of FIG. 1.

FIG. 8 shows one version of a handle used to operate the splicer. The handle 80 comprises an elongated handle body 82 with a handling portion 84 to be manually gripped by a hand at one end and a hub portion 86 at the other end. A hub 88 is rotatably retained in the hub portion. The hub has a bore 90 shaped to receive the end of the shaft 46 (FIG. 5) extending outward of the toggle linkage assembly 36. The handle's hub 88 has a peripheral protrusion, or finger 92, that rotates with the hub. Stops 94, 95 affixed to the hub portion limit the range of rotation of the hub 88 with respect to the handle's body to an angle of less than 360°, such as 210°. When the handle is moved in the direction of arrow 96, the stop 94 pushes the hub 88 along with the handle to turn the shaft 46 and rotate the toggle-linkage hub 38. When the toggle linkage freewheels upon release of the clamp mechanism, the handle's hub is free to rotate toward the other stop 95. In this way, the rapid rotation of the linkage hub is transmitted only to the handle's hub 88 without rotating the entire handle body at the same high speed. A single stop could be used instead of two stops, but, because the two stops are spaced apart over the same angle as the angle between the locked and fully released positions of the toggle linkage hub, the handle remains in a convenient position for the operator.

Figure 9:
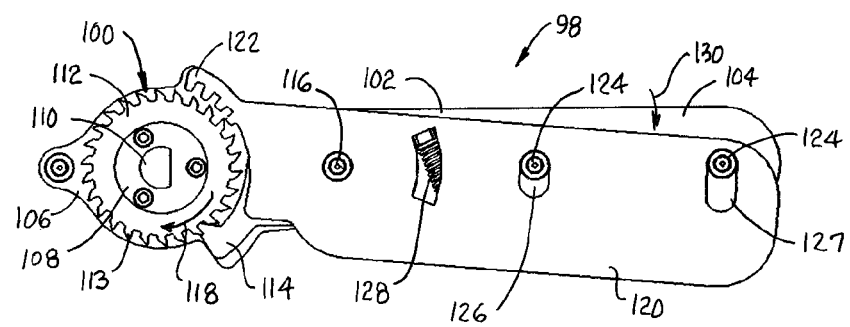
FIG. 9 is a side view of another version of handle usable with the belt splicer of FIG. 1, including a ratchet mechanism.

Another version of a handle is shown in FIG. 9. The handle 98 uses a lockable ratchet mechanism 100 instead. The handle has a handle body 102 with a handling portion 104 and a hub portion 106 at opposite ends. A rotatable hub 108 in the hub portion has a central bore 110 that is shaped to receive the end of the shaft 46 (FIG. 5) that connects to the toggle linkage assemblies 36. A ratchet wheel 112 with teeth 113 forms a periphery of the hub 110. A pawl 114 pivotally attached to the handle body by a pivot pin 116 engages the ratchet teeth and allows the hub and ratchet wheel to rotate counterclockwise 118 as the handle is shown in FIG. 9, but not clockwise, within the handle body, such as when the toggle linkage assembly freewheels. The handle also includes a locking lever 120 with locking teeth 122 at one end. The locking levers attach to the handle body 102 at the pivot pin 116. Guide pins 124 from the handle body are received in slots 126, 127 through the locking lever. A spring 128 between the locking lever and the handle body biases the ratchet mechanism in the unlocked position shown in FIG. 9 and also biases the pawl against the ratchet wheel. When the handle 98 is properly connected to the linkage hub 38, an operator can open the clamp jaws from the locked, closed position by rotating the handle body clockwise 130 in FIG. 9 without squeezing the locking lever. As the toggle linkage moves through its toggle position and the spring takes over, the ratchet wheel 112 and hub 108 ratchet rapidly clockwise ahead of the rotation of the handle body. To close the clamp jaws, the operator squeezes the handle body to pivot the locking lever into the locked position with the locking teeth 122 engaging the ratchet teeth 133 and then rotates the handle counterclockwise.

Figure 10:
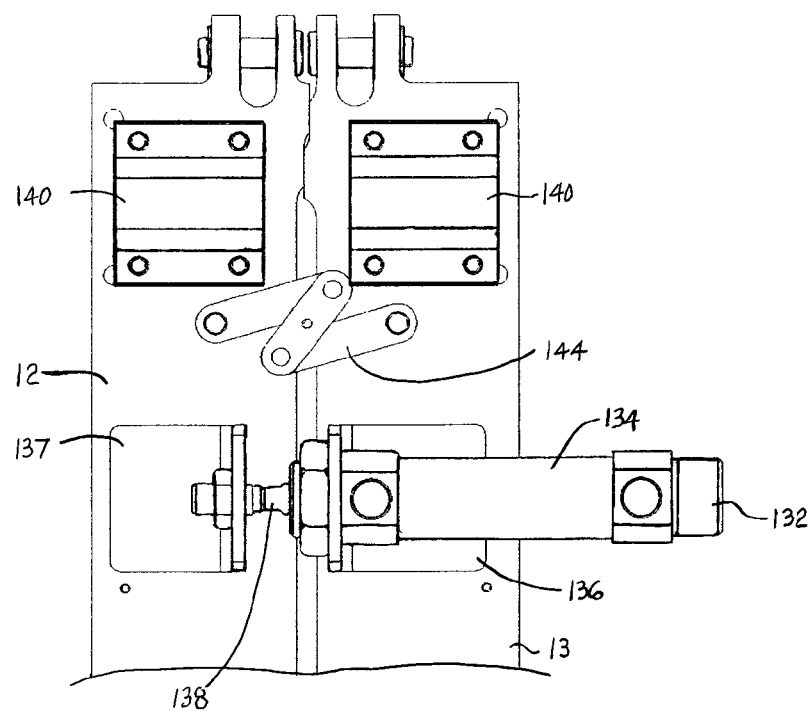
FIG. 10 is a bottom view of an end portion of a belt splicer as in FIG. 1 with the clamp jaws closed, but with an air cylinder replacing the toggle linkage assembly.
Figure 11:
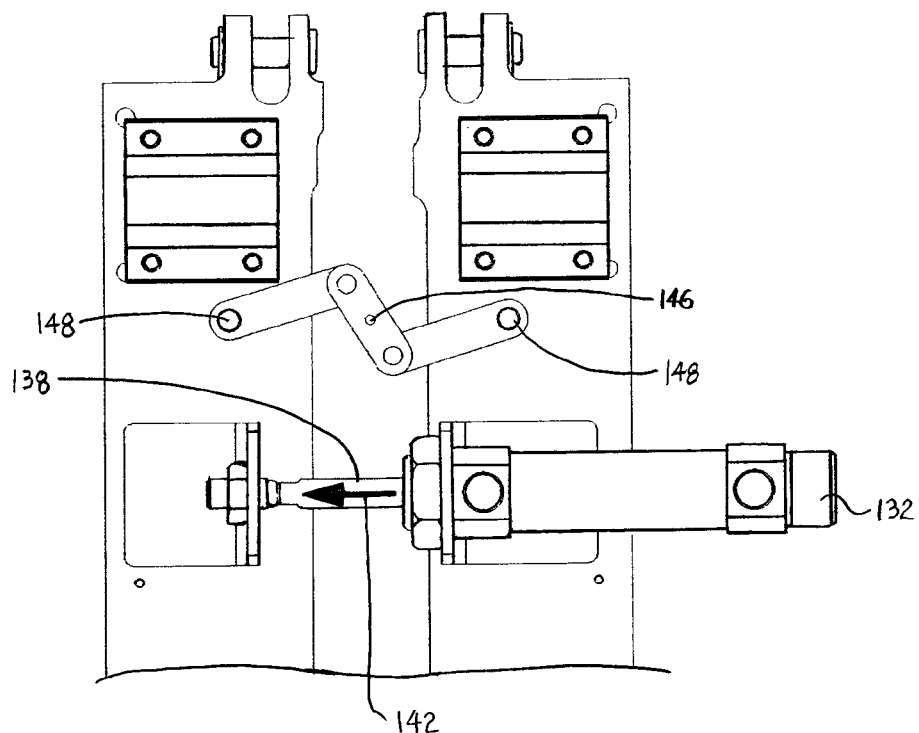
FIG. 11 is bottom view as in FIG. 10 with the clamp jaws open.

An air cylinder 132 is used as an alternative means for rapidly releasing the clamp jaws as shown in FIGS. 10 and 11. The cylinder's body 134 is mounted to the underside of the right clamp jaw 13 by a mounting bracket 136. The distal end of the cylinder's piston rod 138 is fastened to a mounting bracket 137 on the underside of the left clamp jaw 12. Linear bearings 140 on the undersides of the clamp jaws at each end of the splicer receive the guide rails 16 (FIG. 1) on which the clamp jaws ride. The clamp jaws are shown in FIG. 10 in the closed position during butt-welding. In the closed position, the piston rod 138 is largely retracted into the cylinder body 134. When opening the clamp jaws, the piston rod 138 is rapidly thrust out of the cylinder body as indicated by arrow 142 to an extended position producing a force impulse, and its reaction force in the opposite direction, separating the two clamp jaws. A Z-bar linkage 144 with a central pivot 146 pivotally pinned to the fixed splicer frame and with distal ends 148 pivotally attached to the clamp jaws is optionally used to push the two clamp jaws apart in opposite directions at the same speed. The Z-bar linkage may also be used with the toggle linkage assembly. When the air cylinder is used as the means for rapidly releasing the clamp jaws, Open and Close pushbuttons operating electronic or relay logic connected to the air cylinder replaces the handles used with the toggle linkage to control the closing and rapid opening of the splicer jaws. If necessary, multiple air cylinders or Z-bar linkages may be used.

Although the invention has been described in detail with reference to a few preferred versions, other versions are possible. For example, the spring mechanism may comprise extension springs hooked between the distal ends of the linkage arms and the spring seats, with the drawbars and spring retainers eliminated. As another example, the handle may be connected to the shaft at either end of the splicer. And other means for rapidly releasing the clamp jaws, such as hydraulic cylinders or other linear actuators that can produce a force impulse to thrust the clamp jaws rapidly open. So, as these few examples suggest, the scope of the claims is not meant to be limited to the details of the described exemplary embodiments.

What is claimed is:

1. A belt splicer comprising:
   first and second clamp jaws arranged to receive first and second belt ends to be welded together aligned in a confronting relationship;
   means for rapidly releasing the clamp jaws connected to the first and second clamp jaws;
   wherein the means for rapidly releasing the clamp jaws is operable to direct a force impulse directly against the first and second clamp jaws in opposite directions to accelerate the first and second clamp jaws rapidly apart with a toggle linkage assembly having curved toggle sections having first ends connected to a hub rotatable on a hub axis and second ends connected to said means for rapidly releasing and said curved toggle sections being movable from a nested position inside said curves with said first end of each toggle section being adjacent to said second end of the other toggle section and movement from said nested position causes said direct force impulse.

2. A belt splicer as in claim 1 wherein the means for rapidly releasing the clamp jaws comprises:
   a spring mechanism attached between the toggle linkage assembly and the first and second clamp jaws.

3. A belt splicer as in claim 2 wherein
   the curved toggle sections are formed on first and second linkage arms each having a proximal end and a distal end with the proximal ends pivotally attached to the hub on opposite sides of the hub axis and the distal ends connected to the spring mechanism.

4. A belt splicer as in claim 3 wherein the spring mechanism comprises a first spring coupled between the distal end of the first linkage arm and the first clamp jaw and a second spring coupled between the distal end of the second linkage arm and the second clamp jaw.

5. A belt splicer as in claim 3 wherein the spring mechanism comprises a first spring assembly coupled between the distal end of the first linkage arm and the first clamp jaw and a second spring assembly coupled between the distal end of the second linkage arm and the second clamp jaw, wherein each of the first and second spring assemblies includes a spring seat attached to the corresponding clamp jaw and having a through hole, a drawbar extending through the through hole in the spring seat and pivotally attached at one end to the distal end of the corresponding linkage arm, a spring retainer attached to the opposite end of the drawbar, and a compression spring attached at one end to the spring retainer and extending into contact with the spring seat at the opposite end, the compression spring coaxially surrounding the drawbar.

6. A belt splicer as in claim 3 wherein the first and second linkage arms are U-shaped.

7. A belt splicer as in claim 2 further comprising a handle having a handle body with a handling portion at one end and a hub portion at the opposite end and a hub attachable to the toggle linkage assembly and rotatably retained in the hub portion to rotate freely within the handle over a range of less than 360°.

8. A belt splicer as in claim 7 wherein the hub of the handle has a peripheral protrusion and the hub portion of the handle includes at least one fixed stop that limits the hub's rotation in the handle and transfers the rotary motion of the handle to the toggle linkage assembly.

9. A belt splicer as in claim 2 further comprising a handle having a lockable ratchet mechanism attachable to the toggle linkage assembly.

10. A belt splicer as in claim 2 wherein the toggle linkage assembly and the spring mechanism are disposed at one end of the first and second clamp jaws and further comprising a second toggle linkage assembly and a second spring mechanism connected to the first and second clamp jaws at an opposite end of the first and second clamp jaws and a shaft joining the toggle linkage assemblies for simultaneous operation.

11. A belt splicer as in claim 1 further comprising first and second top clamps cooperating respectively with the first and second clamp jaws to sandwich the first and second conveyor belt ends to be welded together in a confronting relationship.

12. A belt splicer as in claim 11 wherein the first and second clamp jaws have upper decks shaped to mate with a non-flat side of the first and second conveyor belt ends and the first and second top clamps have lower surfaces shaped to mate with the non-flat side of the first and second conveyor belt ends.

13. A belt splicer as in claim 1 wherein the first and second clamp jaws each have confronting pads to prevent the first and second clamp jaws from touching, except at the pads.

14. A belt splicer comprising:
first and second clamp jaws separated across a gap and arranged to receive first and second belt ends to be welded together aligned in a confronting relationship;
a toggle linkage assembly;
a spring mechanism connected to the toggle linkage assembly and including a first spring connected to the first clamp jaw and a second spring connected to the second clamp jaw;
wherein the toggle linkage assembly includes a pair of curved linkage arms and is operable from a locked state, in which the first and second springs have high levels of stored energy and push the first and second clamp jaws toward each other, to a released state rapidly releasing the stored energy from the first and second springs into the first and second clamp jaws by directing a force impulse directly against the first and second clamp jaws in opposite directions to accelerate the first and second clamp jaws rapidly apart.

15. A method for operating a belt splicer, comprising:
retaining the butt edges of two belt sections aligned in a confronting relationship in a pair of clamp jaws;
positioning a heating element between the clamp jaws;
moving the clamp jaws toward each other to a closed position with the butt edges of the two belt sections in contact with the heating element to melt the butt edges;
rapidly accelerating the clamp jaws apart with a toggle linkage assembly having curved sections nested together in a nested position when the clamp jaws are in the closed position and movable from the nested position to cause the rapid acceleration of the clamp jaws to cleanly separate the melted butt edges from the heating element.

16. The method of claim 15 wherein the clamp jaws are rapidly accelerated apart by a force impulse directed in opposite directions against each clamp jaw.

17. The method of claim 15 further comprising:
locking the clamp jaws in the closed position.

18. The method of claim 17 further comprising:
storing energy for rapidly accelerating the clamp jaws apart when the clamp jaws are locked in the closed position.

19. The method of claim 15 wherein the clamp jaws are accelerated apart at a greater speed than the clamp jaws are moved toward each other.

20. A belt splicer as in claim 1 wherein the means for rapidly releasing the clamp jaws includes a first spring coupled to the first clamp jaw and a second spring coupled to the second clamp jaw, wherein energy to produce the force impulse is stored in the first and second springs.

* * * * *